United States Patent
Reynolds

(10) Patent No.: US 11,852,213 B2
(45) Date of Patent: Dec. 26, 2023

(54) SECURING DEVICE

(71) Applicant: Gripple Limited, Sheffield (GB)

(72) Inventor: Thomas Reynolds, Sheffield (GB)

(73) Assignee: GRIPPLE LIMITED

( * ) Notice: Subject to any disclaimer, the term of this patent is extended or adjusted under 35 U.S.C. 154(b) by 150 days.

(21) Appl. No.: 17/429,874

(22) PCT Filed: Feb. 21, 2020

(86) PCT No.: PCT/IB2020/051473
§ 371 (c)(1),
(2) Date: Aug. 10, 2021

(87) PCT Pub. No.: WO2020/194075
PCT Pub. Date: Oct. 1, 2020

(65) Prior Publication Data
US 2022/0128121 A1    Apr. 28, 2022

(30) Foreign Application Priority Data

Mar. 22, 2019  (GB) ..................................... 1904007
Apr. 30, 2019  (GB) ..................................... 1906023
Feb. 20, 2020  (GB) ..................................... 2002362

(51) Int. Cl.
*F16G 11/10* (2006.01)
*F16G 11/14* (2006.01)

(52) U.S. Cl.
CPC .......... *F16G 11/106* (2013.01); *F16G 11/101* (2013.01); *F16G 11/146* (2013.01)

(58) Field of Classification Search
CPC .... F16G 11/106; F16G 11/101; F16G 11/146; F16G 11/14
See application file for complete search history.

(56) References Cited

U.S. PATENT DOCUMENTS

| | | | |
|---|---|---|---|
| 349,031 A * | 9/1886 | Cook ...................... | F16G 11/10 24/134 P |
| 626,230 A * | 6/1899 | Hawes .................... | F16G 11/10 24/134 P |
| 1,962,964 A * | 6/1934 | Morrison ............... | F16G 11/101 24/134 P |
| 2,226,393 A * | 12/1940 | Seeger .................. | F16G 11/101 24/134 P |
| 2,836,870 A * | 6/1958 | Shea ..................... | F16G 11/106 24/134 R |

(Continued)

FOREIGN PATENT DOCUMENTS

| AT | 166617 B | 8/1950 |
|---|---|---|
| FR | 2434946 A1 | 3/1980 |

(Continued)

*Primary Examiner* — David M Upchurch
(74) *Attorney, Agent, or Firm* — Clark Hill PLC; James R. Foley

(57) ABSTRACT

A securing device for securing an elongate article includes a rotatable clamping member and a support arrangement for supporting the clamping member. The clamping member is rotatably mounted on the support arrangement. The securing device defines a pathway for the elongate article. The clamping member is rotatably movable into the pathway. The support arrangement further includes an urging formation for urging the clamping member into a clamping position in said pathway.

17 Claims, 16 Drawing Sheets

(56) References Cited

U.S. PATENT DOCUMENTS

| | | | | |
|---|---|---|---|---|
| 4,092,941 A * | 6/1978 | Gryglas | ................... | B63H 9/10 |
| | | | | 114/218 |
| 5,070,805 A | 12/1991 | Plante | | |
| 5,477,593 A * | 12/1995 | Leick | ....................... | A43C 7/00 |
| | | | | 24/712.1 |
| 7,226,043 B2 * | 6/2007 | Stone | ...................... | B63B 21/08 |
| | | | | 254/391 |
| 7,287,303 B2 | 10/2007 | Yang | | |
| 7,287,697 B2 * | 10/2007 | Ehrhart | ................ | G06V 30/142 |
| | | | | 235/472.01 |
| 8,789,485 B2 * | 7/2014 | Juenger | ................... | B63B 21/04 |
| | | | | 292/307 R |
| 2007/0094851 A1 * | 5/2007 | Yang | ................... | B66D 1/7415 |
| | | | | 24/115 R |
| 2007/0169380 A1 | 7/2007 | Borsoi | | |
| 2014/0123439 A1 * | 5/2014 | Bacon | ..................... | F16G 11/10 |
| | | | | 24/134 KB |
| 2015/0315822 A1 * | 11/2015 | Garthe | ...................... | F16P 3/08 |
| | | | | 70/15 |
| 2018/0153262 A1 * | 6/2018 | Shimizu | ................ | F16G 11/106 |

FOREIGN PATENT DOCUMENTS

| | | |
|---|---|---|
| GB | 769646 A | 3/1957 |
| GB | 2247926 A | 3/1992 |
| WO | 2014/059458 A1 | 4/2014 |

\* cited by examiner

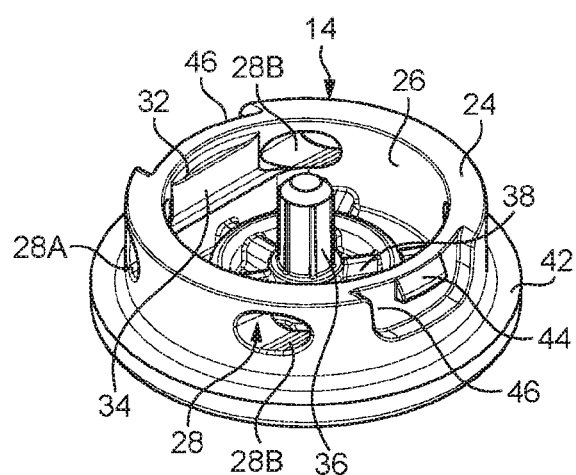
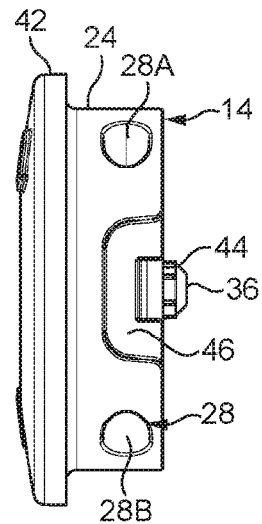
FIG. 3A  FIG. 3B
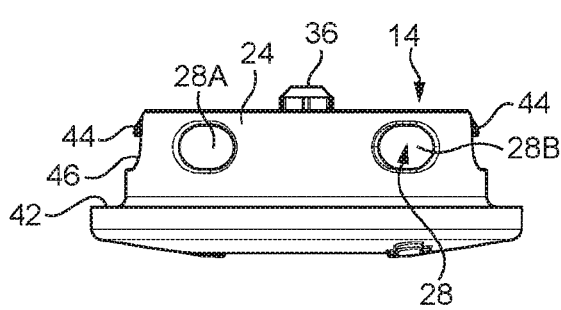
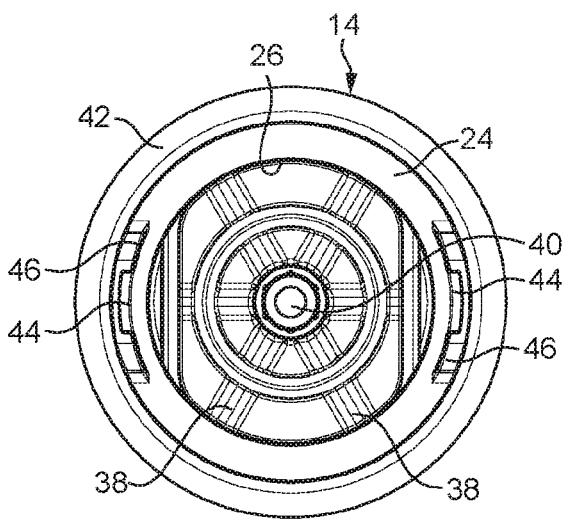
FIG. 3C  FIG. 3D

SECURING DEVICE

This invention relates to securing devices. More particularly, but not exclusively, this invention relates to securing devices for suspending items from elongate articles. Embodiments of the invention relate to securing devices incorporating rotatable clamping members.

The suspension of signage and other articles from wires typically uses devices that are time consuming and difficult to install. Such devices may include a passage through which a wire can extend, and a clamping arrangement comprising a wedge or roller and a compression spring that urges the wedge or roller into clamping engagement with the wire. However, it can often be difficult to uninstall the device after a load has been applied to it for some time.

According to one aspect of this invention, there is provided a securing device for securing an elongate article, the securing device comprising: a rotatable clamping member; a support arrangement for supporting the clamping member; wherein the clamping member is rotatably mounted on the support arrangement; the securing device defining a pathway for the elongate article, wherein the clamping member is rotatably movable into the pathway; and the support arrangement further includes an urging formation for urging the clamping member into a clamping position in said pathway.

According to another aspect of this invention, there is provided a securing arrangement comprising a securing device as described in the immediately preceding paragraph and an elongate article.

Thus, in one embodiment, when the elongate article extends along the pathway, the urging of the clamping member into the clamping position moves the clamping member into clamping engagement with the elongate article. The clamping member may be urged by the urging formation into clamping engagement with the elongate article when the elongate article extends along the pathway.

The support arrangement may comprise a pivot formation to rotatably mount the clamping member on the support arrangement.

The elongate article may be a monofilament, such as a monofilament formed from a plastics material. The monofilament may be formed from nylon. It will be appreciated that the elongate article may alternatively be a wire, wire rope, cable or the like formed from a metal.

The support arrangement may comprise a rotatable carriage. The carriage may be configured for carrying the clamping member. The clamping member may be held on the carriage. Rotation of the carriage may effect rotation of the clamping member. The urging formation may be provided on the carriage. The carriage may be rotatable to move the clamping member away from the clamping position. The rotation of the carriage away from the clamping position may be movement of the carriage to a release position.

The rotation of the carriage to the release position may be rotation of the carriage in a direction opposite to the rotation of the carriage to the clamping position. When the carriage is rotated to the release position, the elongate article may be released, thereby allowing the elongate article to be moved lengthwise relative to the securing device.

The carriage may be formed of a plastics material. The urging formation may be formed of a plastics material. The urging formation may be formed integrally with the carriage. The carriage and the urging formation may be a moulding.

The carriage may comprise an outer portion. The outer portion may extend around an inner region of the carriage. The carriage may include an inner portion extending across the inner region. The inner portion may extend across the outer portion.

The inner portion and the outer portion may be formed integrally with each other. The inner portion may be elongate. The outer portion may define opposed access formations to allow access to and from an internal region of the carriage by the elongate article. The opposed access formations may be first and second slots.

The inner portion may have first and second carrying surfaces facing in opposite directions. The urging formation may be provided on the first carrying surface. The urging formation may be integral with the inner portion.

The outer portion may extend around the urging formation. The urging formation may extend proud of the outer portion. The urging formation may be provided on the inner portion. The inner portion and the urging formation may be formed integrally with each other.

The carriage may be rotatably urged by the urging formation in a first direction to move the clamping member into said pathway. The carriage may be rotatably moved, for example by a user, in an opposite second direction to move the clamping member out of the pathway. Thus, when the clamping member is in clamping engagement with the elongate article, rotation of the carriage in the second direction, moves the clamping member out of engagement with the elongate article.

The carriage may comprise a handle portion to allow a user to rotate the carriage in the second direction. Desirably, the carriage comprises two of the handle portions. The handle portions may be arranged substantially opposite each other. The handle portions may be provided on the outer portion of the carriage.

The securing device may comprise an engaging surface. The engaging surface may engage the elongate article when the clamping member is urged into clamping engagement with the elongate article.

The elongate article may be clamped by the clamping member against the engaging surface when the clamping member is urged into clamping engagement with the elongate article. The engaging surface may apply a reaction force on the elongate article when the elongate article is clamped against the engaging surface.

The securing device may comprise a housing to house the clamping member. The carriage may be rotatably mounted on the housing.

The housing may comprise a wall, which may extend around an internal region of the housing. The wall may be cylindrical. The wall may define a pair of opposed openings through which the elongate article can extend. The opposed openings may define a pathway for the elongate article, the pathway extending between the opposed openings in each pair.

Each pair of opposed openings may comprise an entry opening and an exit opening. The elongate article may be inserted into the housing via the entry openings. The elongate article may exit the housing via the exit opening.

The engaging surface may be provided on the housing. The wall may include an engaging member, which may comprise a segment of the wall. The engaging surface may be a surface of the engaging member. The engaging surface may be an inwardly facing surface of the housing. The engaging surface may be substantially planar. The pathway may extend alongside the engaging surface. The housing may be formed from a plastics material.

The housing may additionally include a support portion for supporting the pivot formation. The support portion may comprise a plurality of elongate support members extending from the wall to a central member.

The pivot formation may be provided on the central member. The support portion may include a flange member extending outwardly from the wall. The flange member may extend radially outwardly from the wall. The outer portion of the carriage may be supported by the flange member.

The pivot formation may extend through the internal region of the housing. The pivot formation may comprise a pivot projection.

The carriage may define an aperture to receive the pivot formation. The pivot formation may rotatably mount the carriage on the housing. The aperture defined by the carriage may be a central aperture. The central aperture may be defined by the inner portion of the carriage.

The clamping member may comprise a main part and a clamping surface on the main part, the clamping surface being for effecting the aforesaid clamping engagement with the elongate article. The main part may define an aperture through which the pivot projection extends to rotatably mount the clamping member on the housing. If desired, the aperture defined by the main part may be elongate.

The aperture defined by the main part may be a central aperture of the clamping member. The aperture defined by the clamping member may be aligned with the aperture defined by the carriage.

The pivot portion may extend through the aperture in the carriage and through the aperture in the clamping member. The clamping member may be rotatably mounted on the housing by the carriage.

The urging of the clamping member in the first direction by the urging formation may urge the clamping surface into the pathway. Rotation of the carriage in the second direction may move the clamping surface out of the pathway.

The urging formation may be a resilient urging formation. The urging formation may comprise an urging member. The urging member may be elongate.

The urging formation may comprise a hub portion. The urging member may extend from the hub portion. The urging member may be a spring member. The spring member may be an elongate linear spring member.

The securing device may also include a reaction surface to apply a reaction force to the urging formation, thereby causing the urging formation to urge the clamping member to the clamping position. The securing device may include a reaction member, the reaction member having the reaction surface.

The securing device may include a cover, which may be disposed on the housing to cover the carriage. The reaction surface may be provided on the cover. The cover may be formed of a plastics material.

The housing may have a first fastening formation and the cover may have a corresponding second fastening formations to cooperate with the first fastening formation to secure the housing to the cover. The first fastening formation may be provided on the wall.

The housing may have two of the first fastening formations. The cover may have two of the corresponding second formations, wherein each of the first fastening formations cooperates with a respective one of the second fastening formations to secure the housing to the cover. Both of the first fastening formations may be provided on the wall.

The cover and the housing may comprise cooperating securing means to secure the cover to the housing. The cooperating securing means may comprise a detent member and an aperture to receive the detent member. Desirably, the cooperating securing means may comprise a pair of the detents and a pair of the apertures, each aperture being configured to receive a respective one of the detents.

The detent may be provided on the housing. The wall may define a recess. The detent may be provided in the recess. The aperture may be defined by the cover. The cover may have a projecting portion defining the aperture.

The clamping member may comprise two of the clamping surfaces on the main part. The clamping surfaces may be opposite each other. The clamping surfaces may face from the main part in opposite directions.

The securing device may define two of the aforesaid pathways. The wall may define two pairs of the opposed openings through which the elongate article extends. Each pair of opposed openings may define a respective pathway for each pass of the elongate article. The pathways may extend between the opposed openings in each pair of the opposed openings.

The elongate article may be arranged in two passes of the same elongate article or may be two separate elongate articles.

The urging of the clamping member in the first direction by the urging formation may rotatably urge each clamping surface into a respective one of the pathways. Rotation of the carriage in the second direction may move each clamping surface out of the respective pathway. Each pathway may extend along a respective opposite side of the clamping member.

The rotation of the carriage in the second direction may be movement of the carriage to a release position. When the carriage is rotated to the release position, the elongate article may be released, thereby allowing the elongate article to be moved lengthwise relative to the securing device.

One elongate article may be provided. Alternatively, two elongate articles may be provided. The securing arrangement may comprise two passes of a single elongate article, or two of the elongate articles.

The clamping member may be urged into clamping engagement with both of the elongate articles or both passes of the elongate article. Each clamping surface may be urged by the urging formation into clamping engagement with the elongate article, or a respective one of the elongate articles.

The securing device may comprise two of the engaging surfaces. The engaging surfaces may be opposed engaging surfaces. The engaging surfaces may face each other.

Each of the engaging surfaces may comprise a respective internal surface of a segment of the wall. Each engaging surface may be substantially planar. Each pathway may extend alongside a respective one of the engaging surfaces.

When the clamping member is urged into the clamping position, each of the engaging surfaces may engage a respective pass of the elongate article, or a respective one of the elongate articles. Each pass of the elongate article, or each elongate article, may be clamped by the clamping member against the respective engaging surface when the clamping member is urged into the clamping position.

Each engaging surface may apply a reaction force on the respective pass, or the respective elongate article, when the respective pass, or the respective elongate article, is clamped against the engaging surface.

The clamping member may comprise two of the clamping surfaces on the main part. The urging formation may urge each of the clamping surfaces into a respective one of the pathways. Rotation of the carriage in the second direction may move both clamping surfaces out of the respective pathways.

The urging formation may comprise two of the aforesaid urging members. Each urging member may be a resilient urging member. Each urging member may be elongate.

Each of the urging member may be a spring member. Each spring member may be an elongate linear spring member. The spring members may extend in opposite directions from the hub portion.

The securing device may comprise two of the reaction surfaces to apply a reaction force to the urging formation, thereby causing the urging formation to urge the clamping member to the clamping position. Each reaction surface may be provided on the cover.

The securing device includes two of the reaction members, each reaction member having a respective reaction surface. The reaction surfaces may be opposed reaction surfaces. The reaction surfaces may face each other.

Both urging members may extend from the hub portion. The urging members may extend in opposite directions from the hub portion. Each urging member may have a proximal end attached to the hub portion. Each urging member may have a distal end spaced from the hub portion. The distal end of each urging member may engage the respective reaction surface.

The carriage and the clamping member may comprise cooperating holding formations to hold the clamping member on the carriage, thereby allowing the clamping member and the carriage to rotate together. The clamping member may be held on the second carrying surface. The second carrying surface and the clamping member may be provided with the corresponding holding formations to hold the clamping member on the second carrying surface.

A clearance arrangement may be defined between the carriage and other components of the securing device to allow linear motion of the clamping member. The clearance arrangement may comprise a clearance between the housing and the carriage.

The clearance arrangement may comprise a clearance between the wall of the housing and the outer portion of the carriage. Alternatively, or in addition, the clearance arrangement may comprise a clearance between the pivot formation and the clamping member. The clearance arrangement may include clearances between the clamping member and the holding formations on the carriage.

The rotation of the clamping member to the clamping position may be in a plane of rotation. The linear motion of the clamping member may also be within the plane of rotation. Thus, the clamping member can move linearly as well as rotatably relative to the carriage in the same plane.

The clearance between the wall of the housing and the outer portion of the carriage may be in the range of 1.72% to 5.3% of the outer diameter of the wall of the housing. Desirably, the clearance between the wall of the housing and the outer portion of the carriage is in the range of 2.32% to 4.7% of the outer diameter of the wall of the housing. Preferably, the clearance between the wall of the housing and the outer portion of the carriage is in the range of 2.92% to 4.1% of the outer diameter of the wall of the housing. A more preferred clearance between the wall of the housing and the outer portion of the carriage may be substantially 3.51% of the outer diameter of the wall of the housing.

The outer diameter of the wall of the housing may be substantially 17.4 mm. The clearance between the wall of the housing and the outer portion of the carriage may be in the range of 0.30 mm to 0.92 mm. Desirably, the clearance between the wall of the housing and the outer portion of the carriage is in the range of 0.40 mm to 0.82 mm. Preferably, the clearance between the wall of the housing and the outer portion of the carriage is in the range of 0.51 mm to 0.71 mm. A more preferred clearance between the wall of the housing and the outer portion of the carriage may be substantially 0.61 mm.

The clearance between the clamping member and the holding formations provides the advantage in the embodiment described herein that the clamping member can effect linear motion relative to the carriage to accommodate differences in the diameter of the elongate article or articles. This ensures tight engagement between the clamping member and the, or each, elongate article.

The cooperating holding formations may comprise a lug, and a cavity for receiving the lug. One of the lug and the cavity may be on the carriage. One of the lug and the cavity may be on the aforesaid inner portion of the carriage. The other of the lug and the cavity may be on the clamping member.

The lug may be provided on the carriage. Desirably, the lug is provided on the inner portion. The cavity may be defined by the clamping member.

The aforesaid clearance between the holding formations on the carriage and the clamping member may include a clearance between the lug and the clamping member, thereby allowing linear motion of the clamping member relative to the lug.

The cooperating holding formations may comprise a holding projection to hold the clamping member. The cooperating holding formations may comprise a surface of the clamping member to cooperate with the holding projection.

The holding projection may be provided on the aforesaid inner portion of the carriage.

The cooperating holding formations may comprise two of the holding projections, wherein the clamping member is held between the holding projections. The cooperating holding formations may comprise two surfaces of the clamping member, each surface being arranged to cooperate with a respective one of the holding projections.

Each holding projection may be provided on the aforesaid inner portion of the carriage. The holding projections may be arranged opposite each other on the inner portion. The clamping member may be arranged between the holding projections.

One of the lug and the cavity may be on the holding projection. The other of the lug and the cavity may be on the clamping member.

Where the cooperating holding formations comprise two of the holding projections, one of the lug and the cavity may be on one of the holding projections. The clamping member may have a corner. The other of the holding projections may comprise a receiving element shaped to receive said corner of the clamping member. The receiving element may be substantially V-shaped.

Alternatively, where the cooperating holding formations comprise two of the holding projections, each holding projections may comprise a receiving element shaped to receive said corner of the clamping member. The receiving element may be substantially V-shaped. The clamping member may have two opposite corners. Each of the holding projections may comprise a receiving element shaped to receive a respective corner of the clamping member.

The aforesaid clearance between the holding formations on the carriage and the clamping member may include a clearance between the receiving element of the holding projection and said corner of the clamping member, thereby allowing linear motion of the clamping member relative to the receiving element.

The cooperating holding formations may comprise the pivot formation. The cooperating holding formation may comprise the pivot projection.

The aforesaid clearance between the holding formations on the carriage and the clamping member may be a clearance between the pivot formation and the clamping member, thereby allowing linear motion of the clamping member relative to the pivot formation.

The clearance between the pivot formation and the clamping member may be in the range of 10% to 23.33% of the diameter of the pivot formation. Desirably, the clearance between the pivot formation and the clamping member is in the range of 12.2% and 21.1% of the diameter of the pivot formation. Preferably, the clearance between the pivot formation and the clamping member is in the range of 14.4% and 18.9% of the diameter of the pivot formation. A more preferred clearance between the pivot formation and the clamping member is substantially 16.66% of the diameter of the pivot formation.

The clearance between the pivot formation and the clamping member may be in the range of 0.3 mm to 0.7 mm. Desirably, the clearance between the pivot formation and the clamping member is in the range 0.37 mm and 0.63 mm. Preferably, the clearance between the pivot formation and the clamping member is in the range 0.45 mm and 0.57 mm. A more preferred clearance between the pivot formation and the clamping member is substantially 0.5 mm.

The clamping member, the carriage and the engaging surface together constitute a clamping arrangement.

The securing device may comprise a blocking member over the exit opening. In the embodiment described herein, the blocking member may prevent the elongate article being inserted into housing via the exit opening.

Each blocking member may comprise a tab portion extending over the exit opening. Each blocking member may further include an attachment portion to attach the blocking member to the carriage or the housing. Each attachment portion may extend from the respective tab portion to attach the respective blocking member to the carriage or housing in a location at which each tab portion extends over the respective exit opening.

At least one embodiment of the invention will now be described by way of example only, with reference to the accompanying drawings, in which:

FIGS. 3A, 3B, 3C and 3D show respectively a top perspective view, a first side view, a second side view and a bottom plan view of a housing forming part of the securing device;

Figure 1A:
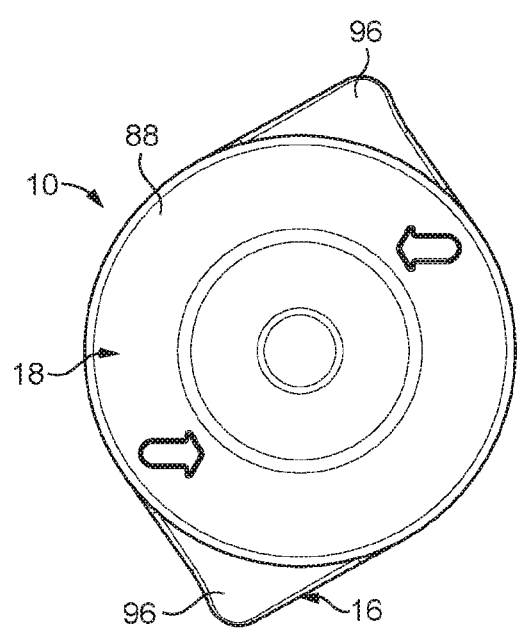
FIGS. 1A, 1B and 1C are respectively a top view, a first side view and a second side view of a securing device.
Figure 1B:
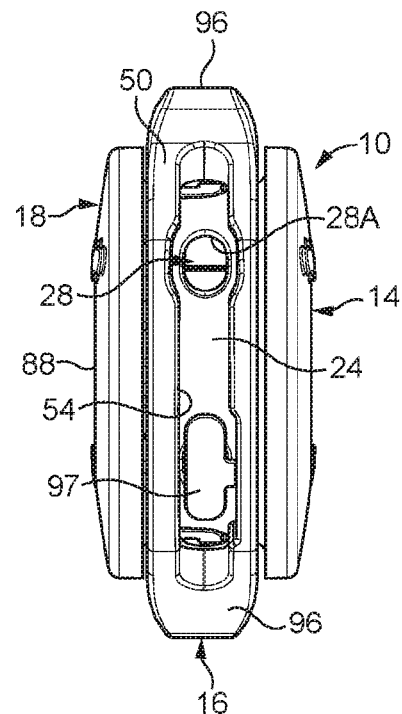
Figure 1C:
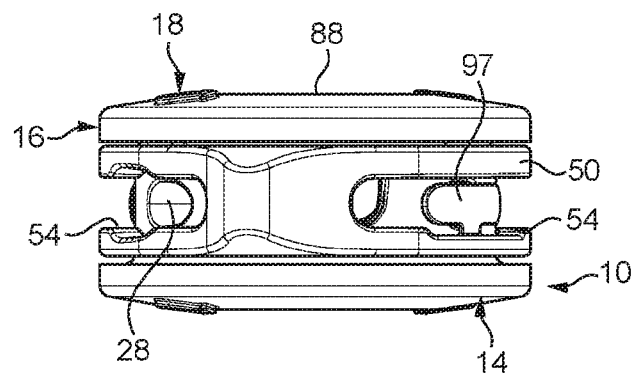

The drawings show a securing device 10 for securing two elongate articles 12 extending through the securing device 10. The two elongate articles 12 may be two separate elongate articles or two passes of the same elongate article 12. For the purposes of this specific description, the securing device 10 is described in use with a single elongate article 12 arranged in two passes through the securing device 10.

The securing device 10 comprises a housing 14, a carriage 16 within the housing 14 and a cover 18 on the housing 14, the cover 18 being arranged over the carriage 16. In the embodiment shown, the elongate article 12 is a monofilament formed from a plastics material, such as nylon.

Figure 2:
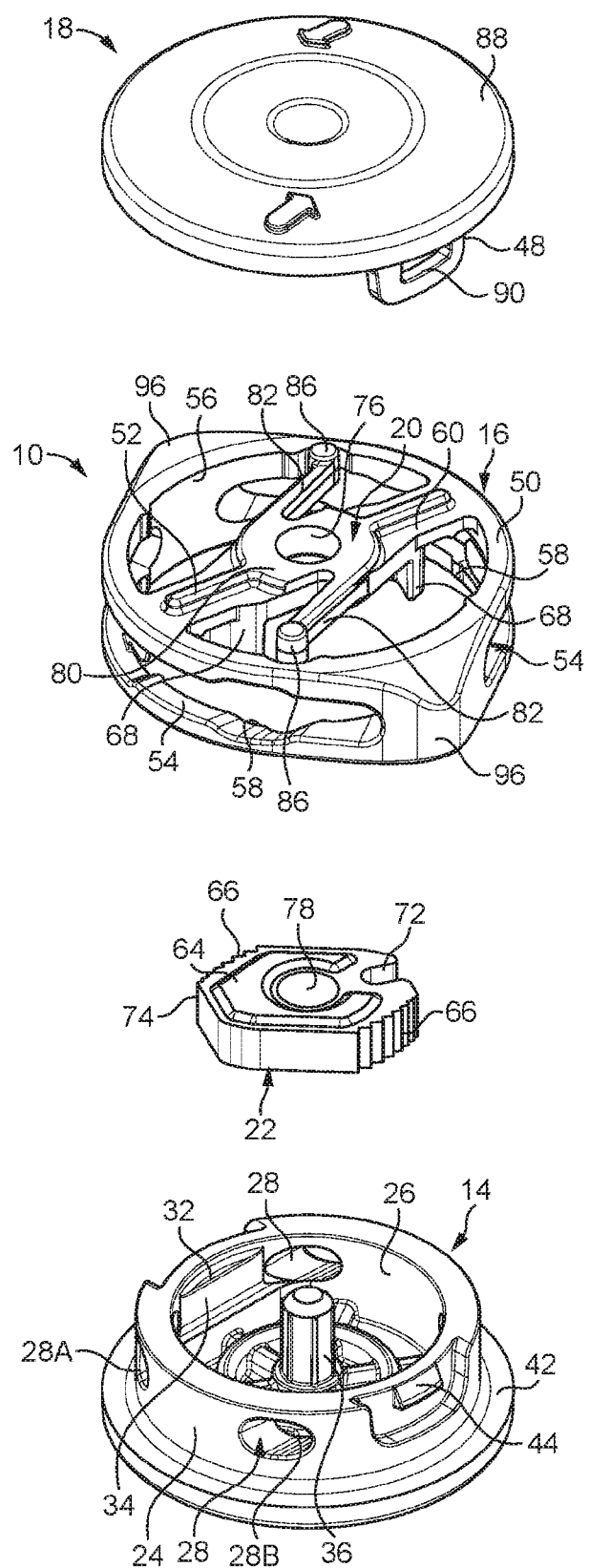
FIG. 2 is an exploded view of the securing device.
Figure 4A:
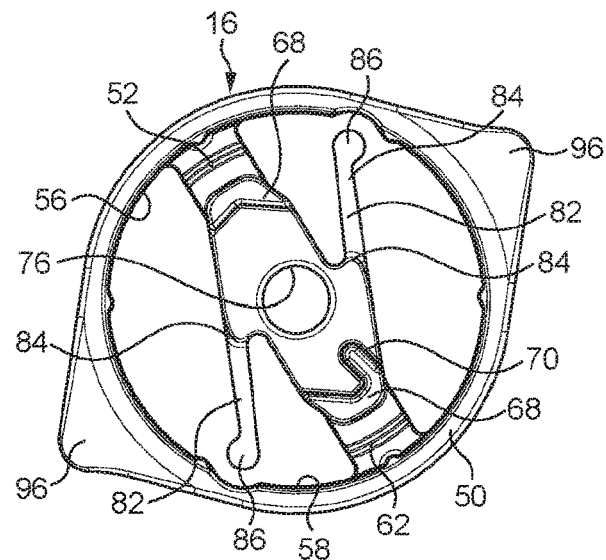
FIGS. 4A, 4B, 4C, 4D and 4E are respectively a bottom plan view, a top plan view, a first side view, a second side view and a top perspective view of a carriage forming part of the securing device.
Figure 4B:
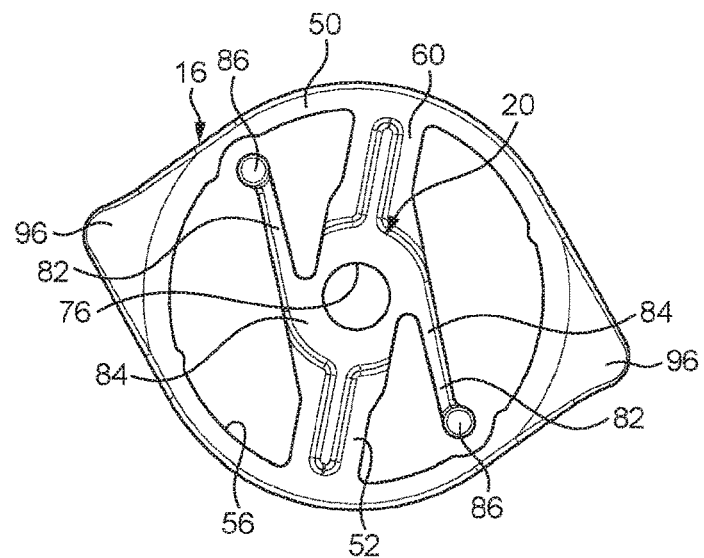
Figure 4C:
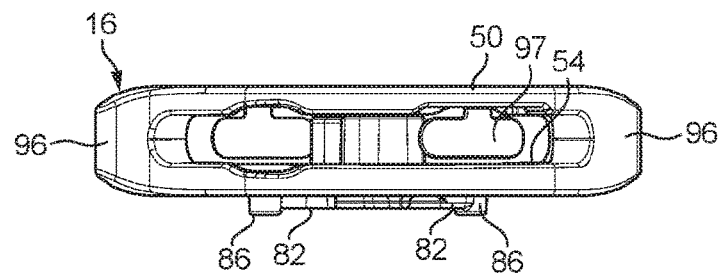
Figure 4D:
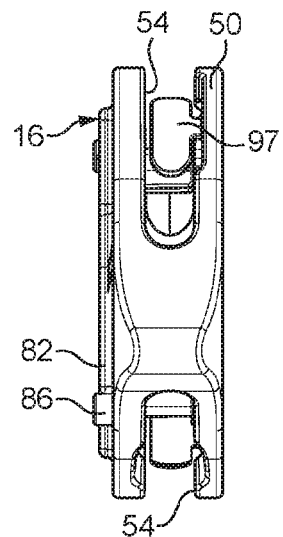
Figure 4E:
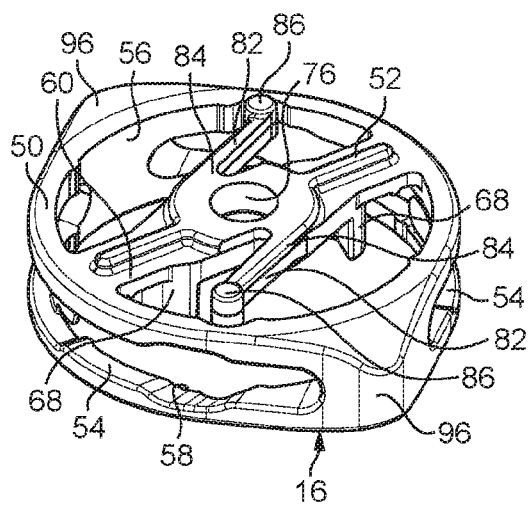
Figure 5A:
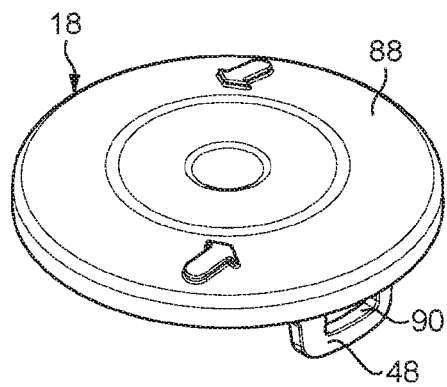
FIGS. 5A, 5B, 5C, 5D and 5E are respectively a top perspective view, a bottom plan view, a first side view, a top plan view and a second side view of a cover forming part of the securing device.
Figure 5B:
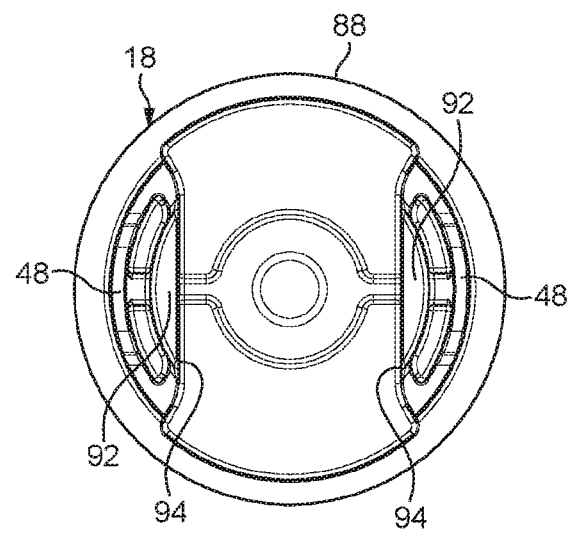
Figure 5C:
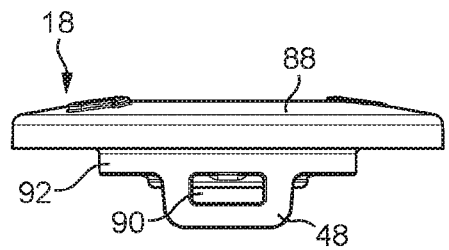
Figure 5D:
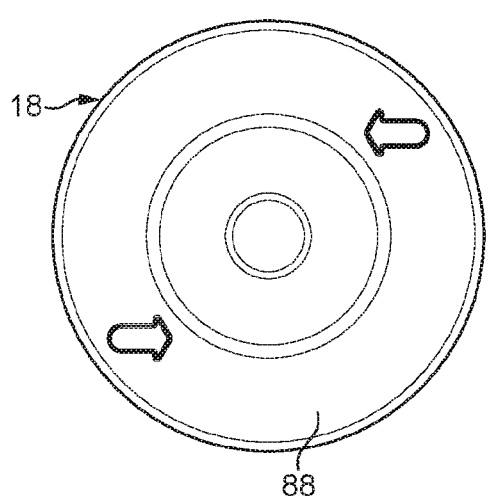
Figure 5E:
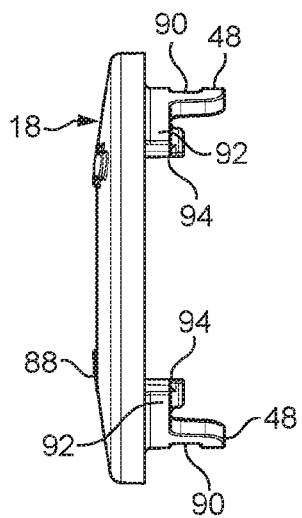

Referring to FIG. 2, an urging formation 20 is provided on the carriage 16, and a clamping member 22 is held by the carriage 16. In the embodiment shown and described herein, the urging formation 20 is formed integrally with the carriage 16. The urging formation 20 and the carriage 16 are a single moulding formed by a moulding process, such as injection moulding. The clamping member 22 is movable relative to the carriage 16, as described in more detail below.

The housing 14 is shown in more detail in FIGS. 3A to 3D, and comprises a cylindrical wall 24 extending around an internal region 26 of the housing 14. The wall 24 defines two pairs of opposed openings 28 through which the elongate article 12 extends.

Each pair of opposed openings 28 comprises an entry opening 28A and an exit opening 28B. The elongate article 12 is inserted into the housing 14 via the entry openings 28A and exit the housing 14 via the exit openings 28B.

Figure 6:
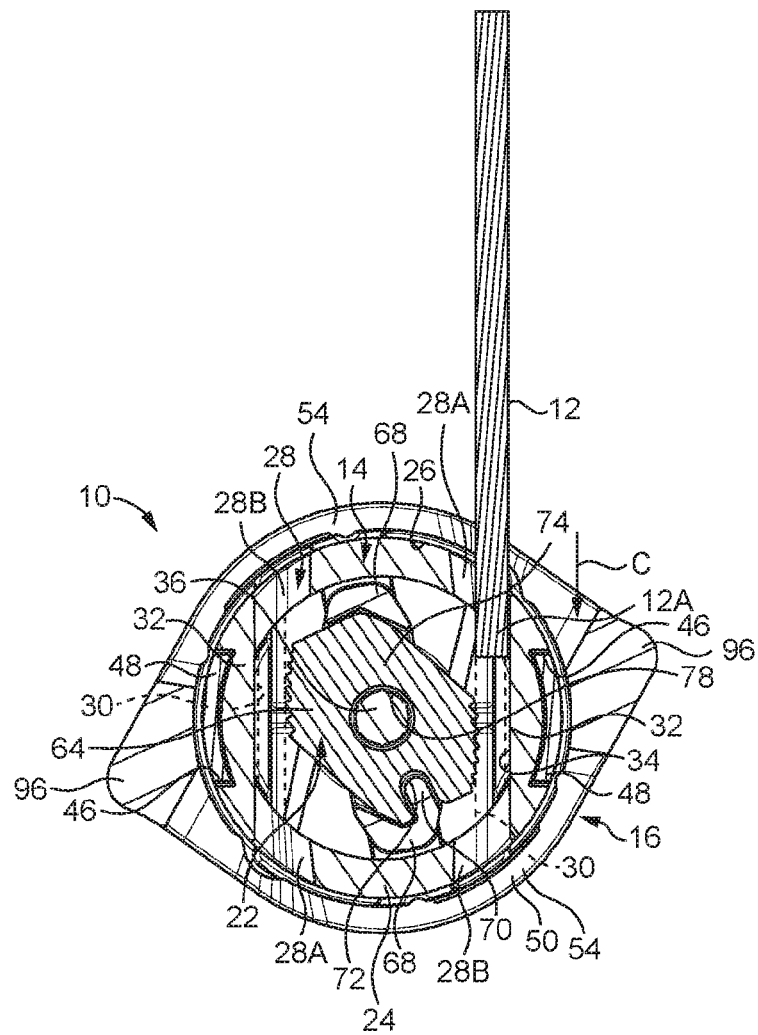
FIG. 6 is a sectional bottom view of the securing device, showing a first step of insertion of the elongate article, in which the clamping member is in a clamping position on insertion of a first end of an elongate article into the securing device.

Each pair of opposed openings 28 defines a respective pathway 30 for the elongate article 12. The pathways 30 extend between the opposed entry and exit openings 28A, 28B in each pair of openings 28. In FIG. 6, the pathways 30 are shown in broken lines.

Figure 8:
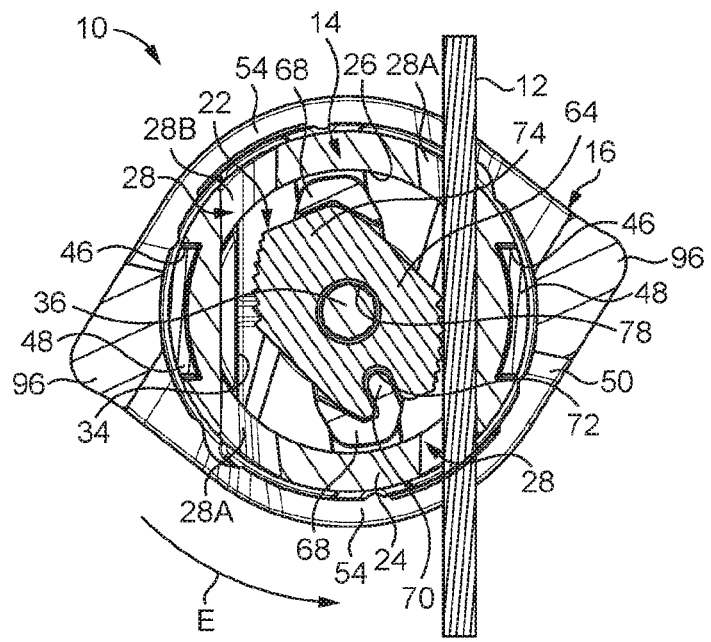
FIG. 8 is a sectional bottom view of the securing device showing a third step in which the clamping member is urged to the clamping position.

The wall 24 also includes two opposed engaging members 32 in the form of segments of the cylindrical wall 24 (see FIG. 3A). Each of the engaging members 32 has an inwardly facing engaging surface 34, shown in FIGS. 6 and 8.

The engaging surfaces 34 are opposite each other, and face one another. The engaging surfaces 34 extend along the pathways 30 to provide respective surfaces against which the two passes of a single elongate article 12 are clamped by the clamping member 22.

The carriage 16, the clamping member 22, and the engaging surfaces 34 together constitute a clamping arrangement. The clamping arrangement clamps the two passes of the elongate article 12.

The housing 14 also includes a pivot formation, in the form of a pivot projection 36, to rotatably mount the carriage 16 and the clamping member 22 on the housing 14. In addition, the housing 14 includes a support portion in the form of a plurality of elongate support members 38.

The support members 38 extend from the wall 24 to a central member 40, thereby supporting the pivot projection 36. The pivot projection 36 extends from the central member 40.

The pivot projection 36 is provided on the central member 40 and extends through the internal region 26 of the housing 14. In the orientation of the housing 14 shown in FIG. 3A, the pivot projection 36 extends upwardly from the central member 40.

The housing 14 has a flange member 42 extending radially outwardly from the wall 24. The purpose of the flange member 42 is explained below.

The wall 24 has two first fastening formations 44 held in respective recesses 46 in the wall 24. The cover 18 has two corresponding second fastening formations 48 (see FIG. 2) to cooperate with the first fastening formations 44. The cooperation of the first fastening formations 44 with the second fastening formations 48 secures the housing 14 to the cover 18. The first and second fastening formations 44, 48 are described in more detail below.

The carriage 16 is shown in more detail in FIGS. 4A to 4E, and comprises a substantially cylindrical outer portion 50 and an elongate inner portion 52 extending across the outer portion 50. Two opposed elongate slots 54 are defined in the outer portion 50. The slots 54 allow the two passes of the elongate article 12 to extend through the outer portion 50.

The outer portion 50 extends around an inner region 56 of the carriage, and has an open face 58 to allow access to the inner region 56. The inner portion 52 extends across the inner region 56 of the carriage.

The wall 24 of the housing 14 is received in the inner region 56 of the carriage 16, so that when the securing device 10 is assembled, the outer portion 50 of the carriage 16 extends around the wall 24. When so received, the opposed entry and exit openings 28A, 28B in the wall 24 of the housing 14 are aligned with the opposed elongate slots 54 defined by the outer portion 50 of the carriage 16. The slots 54 are elongate to allow the carriage 16 to be rotated when the two passes of the elongate article 12 extend through the securing device 10.

When the wall 24 of the housing 14 is received in the outer portion 50 of the carriage 16, the wall 24 engages the flange member 42, and is supported by the flange member 42.

The elongate inner portion 52 has first and second carrying surfaces 60, 62 facing in opposite directions. The first carrying surface 60 faces away from the inner region 56 around which the outer portion 50 extends. The second carrying surface 62 faces into the inner region 56.

The urging formation 20 is provided on the first carrying surface 60, and is integral therewith. The second carrying surface 62 and the clamping member 22 are provided with corresponding holding formations to hold the clamping member 22 on the second carrying surface 62.

The clamping member 22 comprises a main part 64 and opposite clamping surfaces 66 on the main part 64 (see FIG. 2). The clamping surfaces 66 are provided to effect clamping engagement with the two passes of the elongate article 12. Each clamping surface 66 may be provided with teeth in the form of serrations to bite against the elongate article 12.

The cooperating holding formations comprise two holding projections 68 on the second carrying surface 62. The holding projections project from the second carrying surface 62 to hold the clamping member 22 therebetween. A lug 70 is provided on one of the holding projections 68. The lug 70 is received by a cavity 72 defined by the clamping member 22 at a corner thereof. The other of the holding projections 68 comprises a substantially V-shaped receiving element shaped to receive a corner 74 of the clamping member 22. Thus, the clamping member 22 is held by the carriage 16.

The inner portion 52 of the carriage 16 defines a central aperture 76 through which the pivot projection 36 extends to rotatably mount the carriage 16 on the housing 14. The main part 64 of the clamping member 22 defines a central aperture 78.

When the clamping member 22 is held by the holding formations of the carriage 16, the central aperture 76 defined by the carriage 16 is aligned with the central aperture 78 defined by the clamping member 22 so that the pivot projection 36 extends through both central apertures 76, 78. In the embodiment shown in FIGS. 1 to 17, the central aperture 78 is circular, to correspond in size and shape with the pivot projection 36.

The urging formation 20 comprises a hub portion 80 (see FIG. 15) and two elongate resilient urging members 82 extending from the hub portion 80. Each urging member 82 has a proximal end 84 attached to the hub portion 80, and a distal end 86 spaced from the proximal end 84.

The distal end 86 of each urging member 82 engages the cover 18 to provide a reaction force on each urging member 82, as explained below.

The cover 18 is shown in more detail in FIGS. 5A to 5E. The cover 18 comprises a capping portion 88 that extends over the housing 14 when the cover 18 is secured thereto.

The first fastening formations 44 on the wall 24 of the housing 14 comprise detent members. The second fastening formations 48 on the cover 18 extend from the capping portion 88. Each second fastening formation 48 defines an aperture 90 to receive the detent members of the first fastening formations 44, thereby securing the housing 14 to the cover 18. The two corresponding second fastening formations 48 extend from the capping portion 88 in the same direction as each other substantially perpendicular to the capping portion 88.

As discussed above, the wall 24 of the housing 14 is received by the outer portion 50 of the carriage 16. In order to engage the first fastening formations 44 on the wall 24 of the housing 14, the second fastening formations 48 are also received by the outer portion 50 of the carriage 16. Thus, the outer portion 50 of the carriage 16 extends around the wall 24 and the second fastening formations 48, thereby allowing the second fastening formations 44, 48 to cooperate with each other and fasten the cover 18 to the housing 14, thereby holding the outer portion 50 of the carriage 16 between the flange member 42 of the housing 14, and the capping portion 88 of the cover 18.

The cover 18 includes a pair of opposed reaction members 92, each reaction member 92 having a respective reaction surface 94. The reaction surfaces 94 face each other.

In the embodiment shown, the reaction members 92 extend from the second fastening formations 48, but it will be appreciated that the reaction members 92 could be arranged at other locations around the cover 18.

The reaction members 92 extend from the capping portion 88 in the same direction and are thereby disposed in an opposed arrangement relative to each other. As a result, the reaction members 92 define a space therebetween in which the urging formation 20 is received.

The distal end 86 of each urging member 82 engages a respective one of the reaction surfaces 94 and are resiliently deformed by their engagement with the reaction surfaces 94, thereby rotatably urging the carriage 16 and the clamping member 22 in a first direction, so that the clamping member 22 is rotated towards the clamping position. The first direction is shown by the arrows A in FIG. 15.

Figure 14:
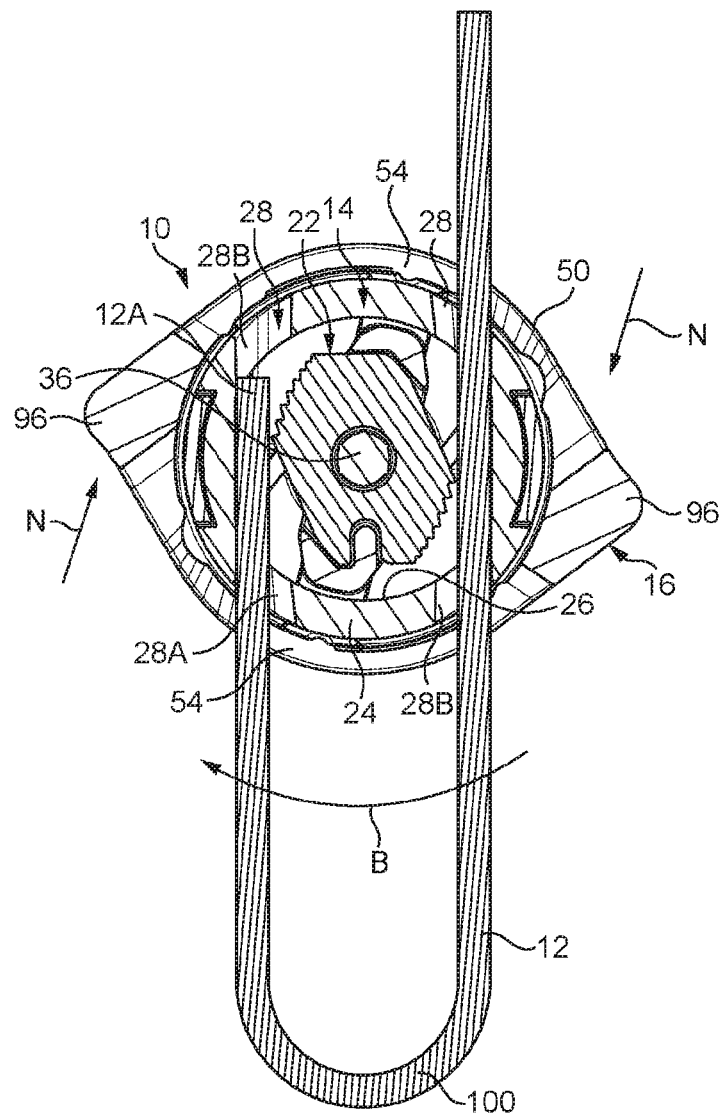
FIG. 14 is a sectional bottom view of the securing device showing a step of releasing the clamping member from the clamping position.

The carriage 16 comprises two handle portions 96 on the outer portion 50 to allow a user to rotate the carriage 16 in second direction opposite to the first direction, as shown by the arrow B in FIG. 14. This is explained in more detail below.

The handle portions 96 are arranged substantially opposite each other on the outer portion 50, and project outwardly from the outer portion 50 between the capping portion 88 of the cover 18 and the flange member 42 of the housing 14.

When the carriage 16 is rotated in the second direction, by twisting the carriage 16, the clamping member 22 is moved out of the clamping position, as shown in FIG. 14, allowing adjustment of the position of the securing device 10 along the elongate article 12.

The operation of the securing device 10 will now be described with reference to FIGS. 6 to 15.

Figure 15:
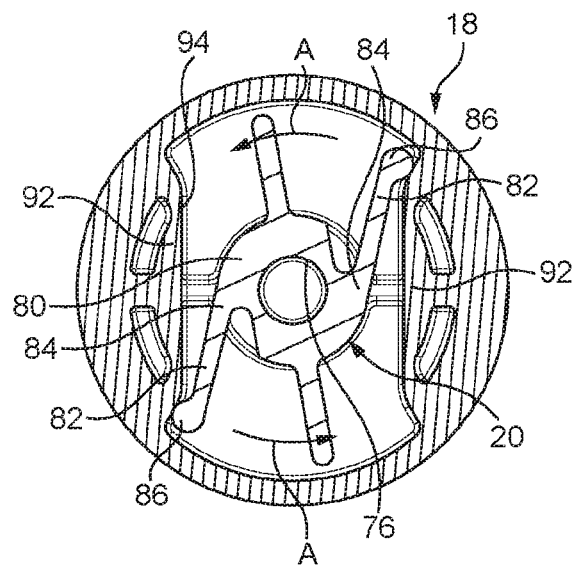
FIG. 15 is a sectional top view of the securing device showing an urging formation.

FIG. 6 shows a sectional view through the securing device 10 so that the clamping member 22 is visible. In FIG. 6, the clamping member 22 is in a clamping position. FIG. 15 shows another sectional view, in which the urging formation 20 is visible. The urging formation 20 is shown in FIG. 15 in the condition taken by the urging formation 20 when the clamping member 22 is in the clamping position.

A first end 12A of the elongate article 12 is fed into the housing 14 through a first of the opposed slots 54 in the outer portion 50 of the carriage 16 and through one of the opposed entry openings 28A of a first pair of the opposed openings 28.

Figure 7:
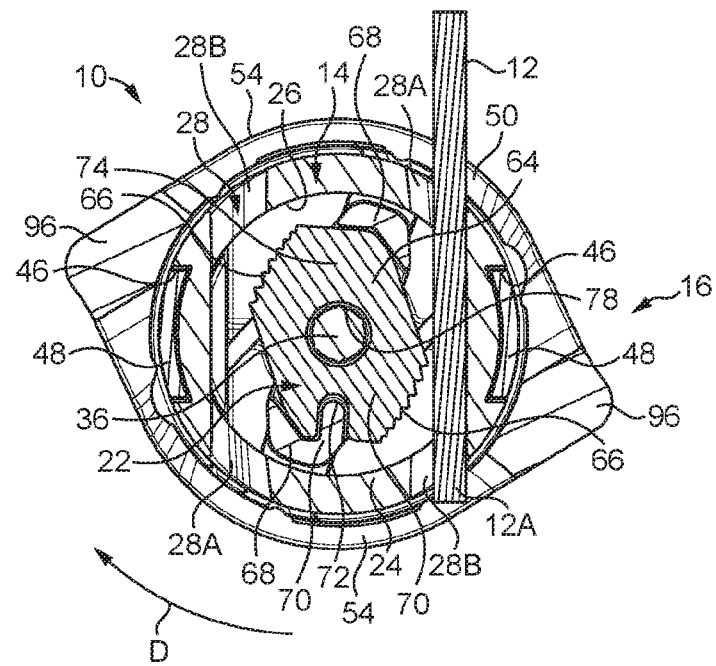
FIG. 7 is a sectional bottom view of the securing device showing a second step in which the clamping member is moved away from the clamping position on further insertion of the elongate article.

The elongate article 12 is fed into the securing device 10 in the direction indicated by the arrow C in FIG. 6. The elongate article 12 is fed along one of the pathways 30 through the securing device 10, as shown in FIG. 7, and pushes the clamping member 22 so that the clamping member 22 and the carriage 16 rotate in the second direction, as indicated by the arrow D in FIG. 7, to move the clamping member 22 away from the clamping position. Such rotation of the clamping member 22 is against the force applied by the urging member 82 to the carriage 16.

The rotation of the carriage 16 in the second direction indicated by the arrow D in FIG. 7 has the effect of rotating the urging member 20 in the direction opposite to the direction indicated by the arrows A in FIG. 15. The effect of this is to slide the distal ends 86 of each urging member 82 across the respective reaction surfaces 94, thereby increasing the urging force applied by the urging members 82 to rotate the carriage 16 back in the first direction indicated by the arrows A.

Figure 9:
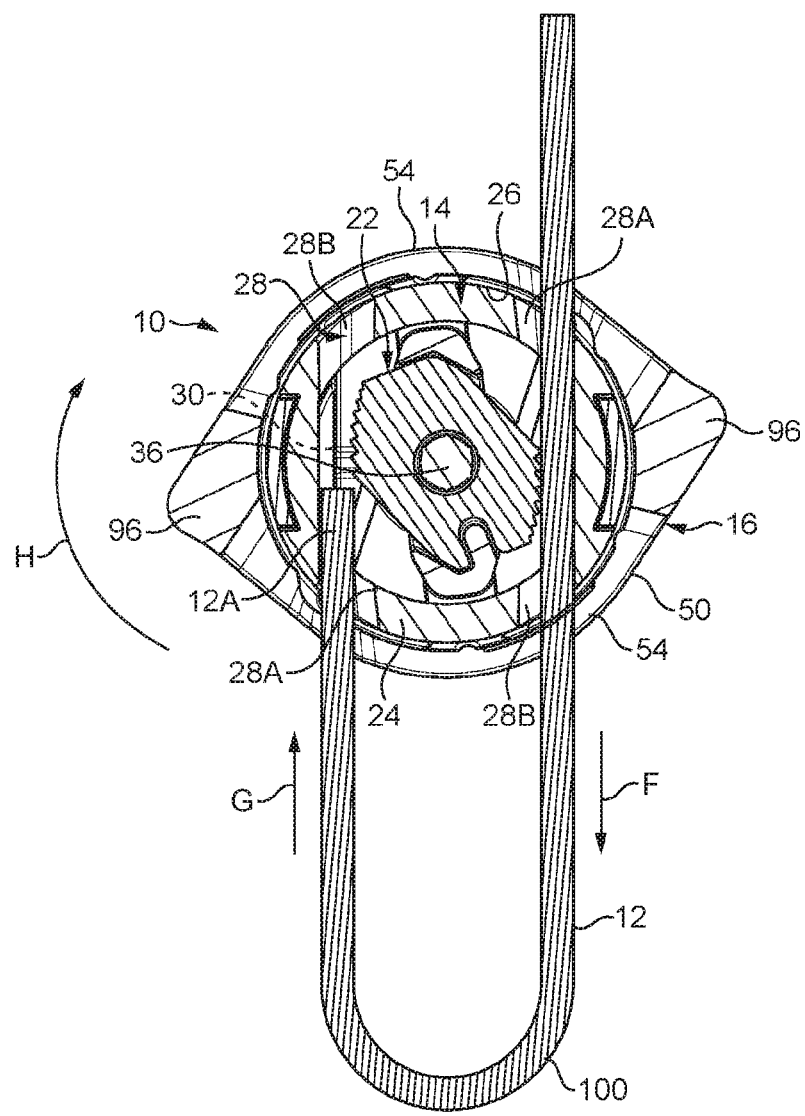
FIG. 9 is a sectional bottom view of the securing device showing a fourth step in which the first end of the elongate article is inserted back into the securing device.
Figure 10:
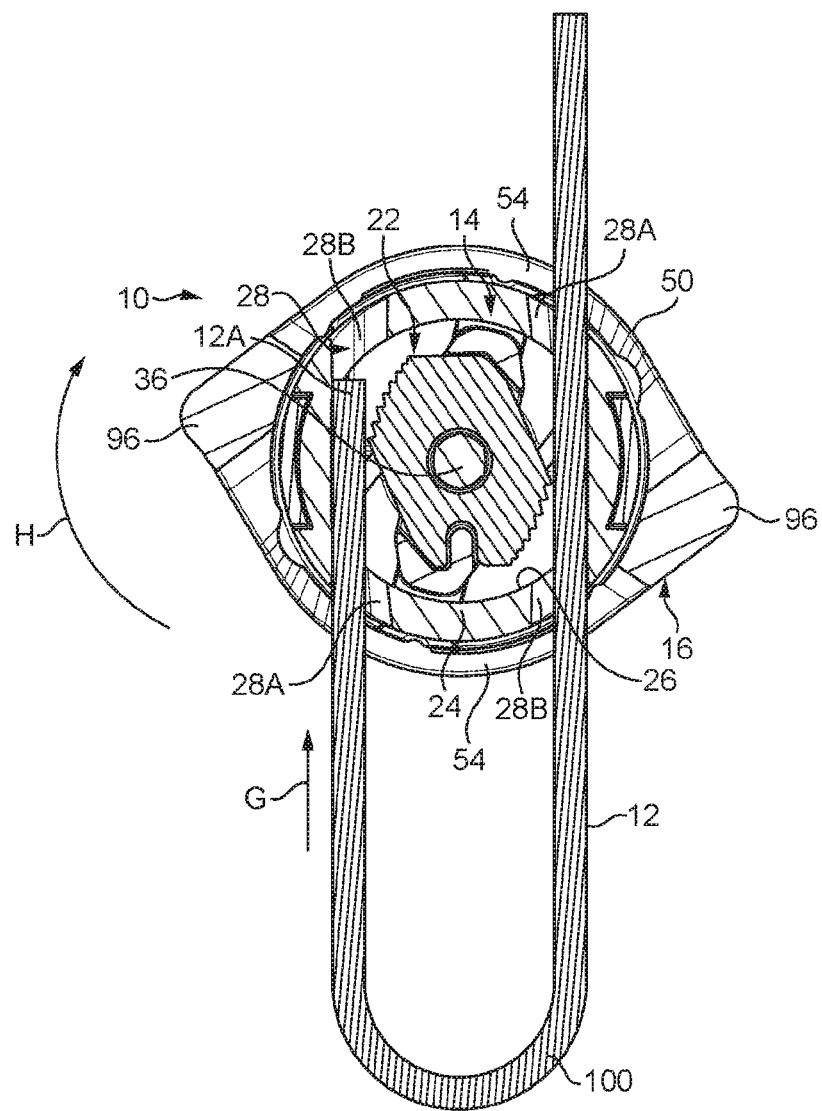
FIG. 10 is a sectional bottom view of the securing device showing a fifth step in which the first end of the elongate article is inserted back through the securing device to create a loop in the elongate article.

Referring to FIG. 9, the elongate article 12 is fed further through the housing 14 to exit from the securing device 10 via the exit opening 28B of the first pair of the opposed openings 28. The elongate article 12 is then fed, or pulled, through the securing device 10 in the direction of the arrow F in FIG. 9, until a suitable length of the elongate article 12 extends from said exit opening 28B of the first pair of openings 28. Movement of the elongate article 12 is then ceased. The urging force applied by the urging formation 20 to the carriage 16 rotates the carriage 16 and the clamping member 22 in the first direction shown by the arrow E in FIG. 8. As a result, the teeth on the clamping surface 66 bite against the elongate article 12.

The first end 12A of the elongate article 12 is fed through a hole in an item to be suspended, for example signage. The first end 12A is then fed back into the securing device 10 via a second of the opposed slots 54 and through the entry opening 28A of the second pair of the opposed openings 28, as shown by the arrows G in FIGS. 9 and 10. A loop 100 is thus created in the flexible elongate article 12 enabling the elongate article 12 to hold the item. FIG. 9 does not show the item to be suspended, but does show the first end 12A being fed back into the securing device 10.

The elongate article 12 is then fed back through the securing device 10 along the second pathway 30. The first end 12A of the elongate article 12 engages and pushes the clamping member 22. This causes the clamping member 22 and the carriage 16 to rotate in the second direction so that the clamping member 22 is again moved away from the clamping position, as indicated by the arrows H in FIGS. 9 and 10.

Figure 11:
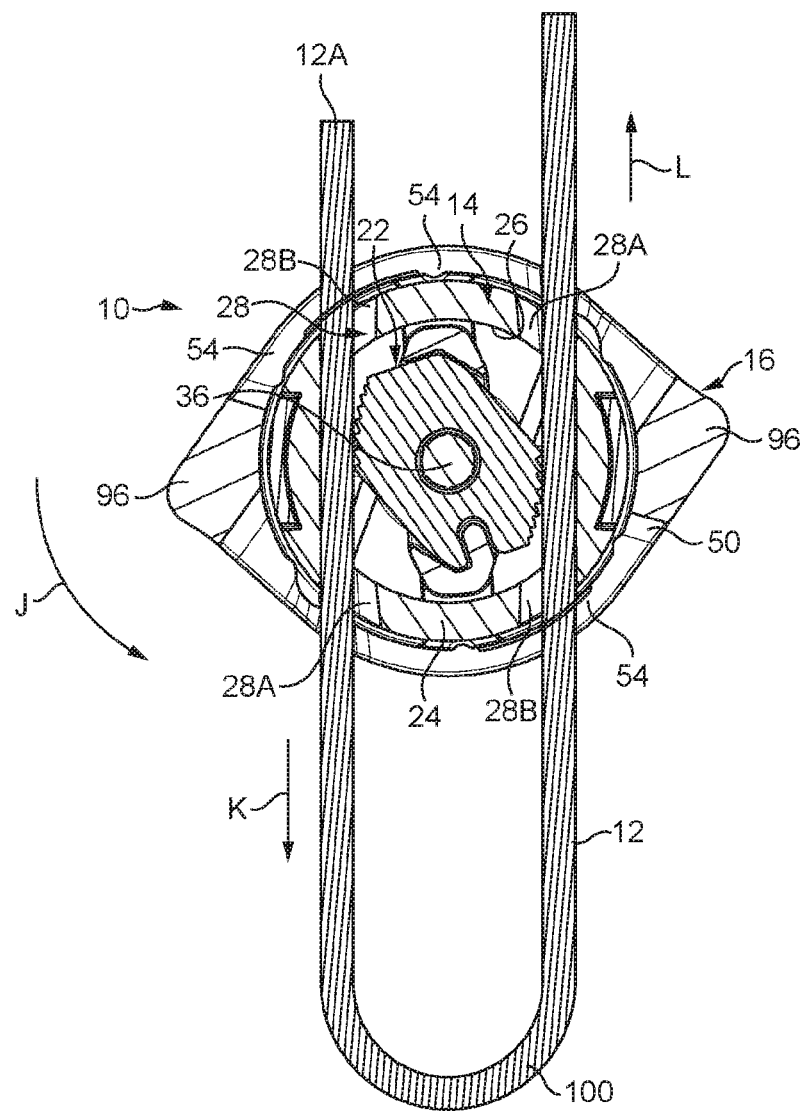
FIG. 11 is a sectional bottom view of the securing device showing a sixth step in which the elongate article is reversed through the securing device to move the clamping member to the clamping position.

Referring to FIG. 11, the elongate article 12 is continued to be fed through the housing 14 until the first end 12A exits from the securing device 10 via the exit opening 28B of the second pair of openings 28. Thus, two passes of the elongate article 12 now extend through the securing device 10.

Movement of the elongate article 12 is then ceased. The urging force applied by the urging formation 20 to the carriage 16 urges the carriage 16 and the clamping member 22 in the first direction shown by the arrow J in FIG. 11. As a result, each clamping surface 66 engages a respective one of the passes of the elongate article 12. The teeth on each of the clamping surfaces 66 bite against a respective one of the passes of the elongate article 12.

Figure 12:
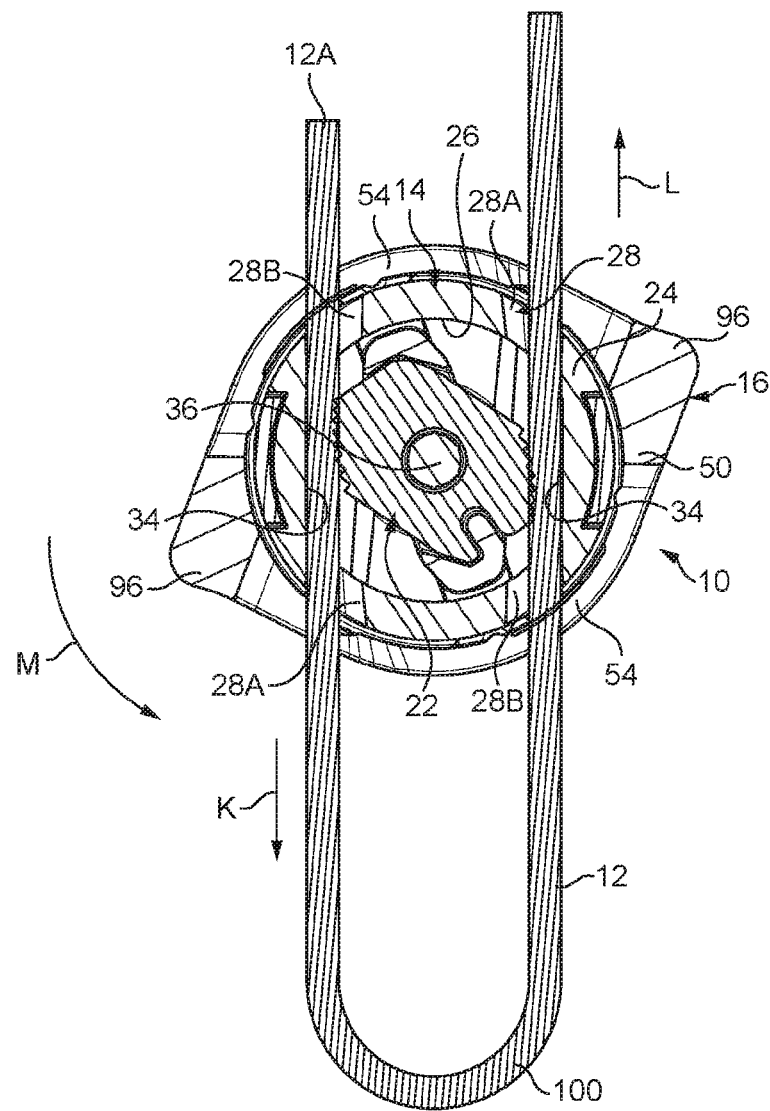
FIG. 12 is a sectional bottom view of the securing device showing a seventh step in which the clamping member is moved to the clamping position.

In order to clamp the elongate article 12 tightly by the clamping member 22, the two passes of elongate article 12 are then pulled in the direction opposite to the direction in which the elongate article 12 was fed into the securing device, as shown by the arrows K and L in FIGS. 11 and 12. This pulls the clamping member 22 and the carriage 16 further in the direction indicated by the arrow M in FIG. 12, thereby rotating the clamping member 22 so that the clamping surfaces 66 are pulled into tight clamping engagement with the respective passes of the elongate article 12. Thus, the clamping member 22 clamps the two passes of the elongate article 12 against the respective engaging surfaces 34.

Referring to FIG. 14, the clamping member 22 can be released from clamping engagement with the elongate article 12 by moving the handle portions 96 in the directions indicated by the arrows N in FIG. 14, thereby twisting the carriage 16 in the second direction indicated by the arrow B. This rotates the clamping member 22 out of clamping engagement with both passes of the elongate article 12. The securing device 10 can then be removed from the elongate article 12, or its position adjusted therealong.

In order to prevent insertion of the elongate article 12 into the housing 14 via the exit openings 28B instead of via the entry openings 28A, each of the exit openings 28B is provided with a blocking member 97. The blocking member 97 is shown as part of the securing device 10, shown in FIG. 17.

Figure 17:
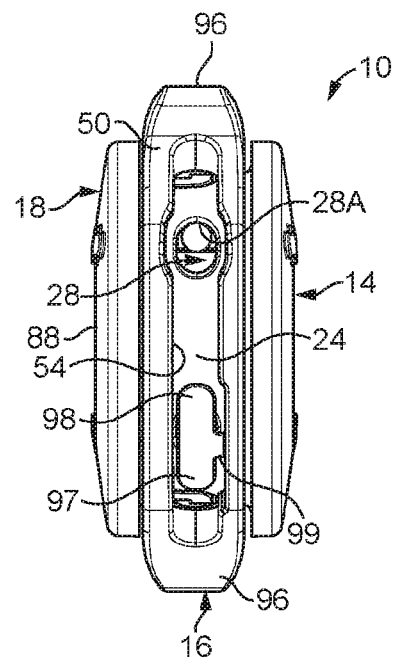
FIG. 17 is an enlarged view, similar to FIG. 1B, of the securing device.

Only one blocking member 97 is shown in FIG. 17, over one of the exit openings 28B. It will be appreciated that the securing device 10 includes a second blocking member 97 provided on the opposite side of the carriage 16 over the other exit opening 28B.

Each blocking member 97 comprises a tab portion 98 extending over and around the exit opening 28B. Each blocking member 97 further includes an attachment portion 99 extending from the tab portion 98 to attach the respective blocking member 97 to the carriage 16 in a location at which each tab portion 98 extends over the respective exit opening 28B.

When the elongate article 12 is inserted correctly into the housing 14, via the entry opening 28A to exit via the exit opening 28B, the elongate article 12 pushes the blocking member 97 out of the way. However, if the user attempts to insert the elongate article 12 into the exit opening 28B, the tab portion 98 prevents such insertion.

Figure 13:
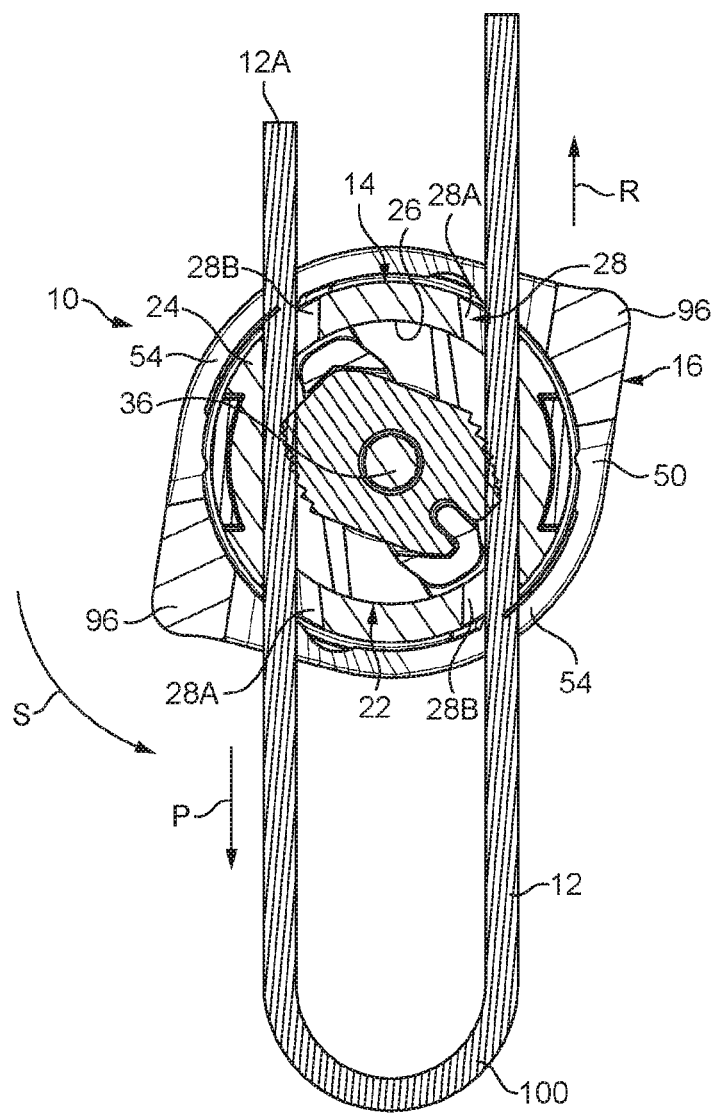
FIG. 13 is a sectional bottom view of the securing device showing an eighth step in which the clamping member is moved into tighter clamping engagement with the elongate article.

FIG. 13 shows the situation when a significant load is applied to the loop formed by the elongate article 12. In such a situation, the movement of the elongate article 12 in the direction indicated by the arrows P and R, causes the clamping member 22 and the carriage 16 to rotate further in the direction indicated by the arrow S. This causes the clamping member 22 to be rotated into even tighter engagement with both passes of the elongate article 12.

Figure 16:
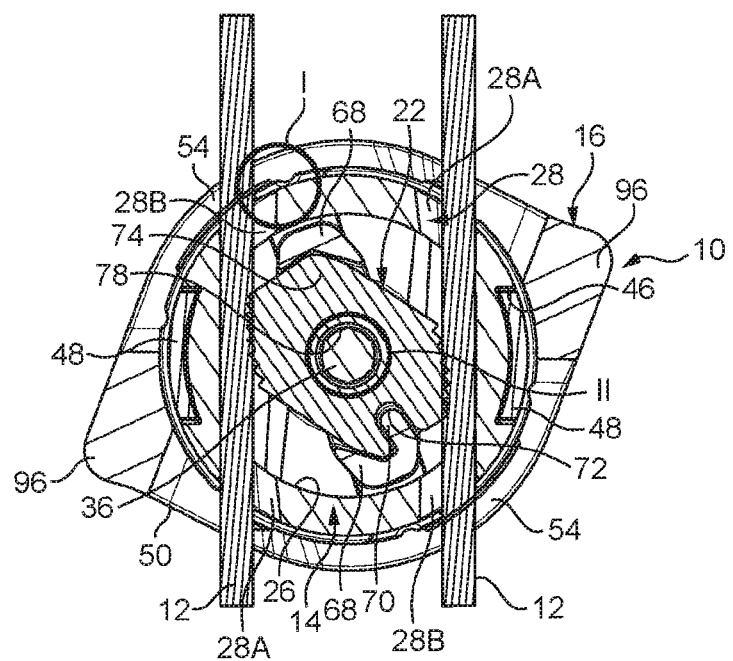
FIG. 16 is a sectional bottom view of the securing device showing clearances between components thereof.

Referring to FIG. 16, two regions are marked I and II. These regions indicate clearances between components of the securing device 10.

The region marked I indicates a first clearance, namely a clearance between the wall 24 of the housing 14 and the outer portion 50 of the carriage 16. In the embodiment shown, the first clearance is substantially 3.51% of the outer diameter of the wall of the housing 14. In the embodiment shown, the first clearance is substantially 0.61 mm.

The region marked II indicates a second clearance, namely a clearance between the clamping member 22 and the pivot projection 36. In the embodiment shown, the second clearance is substantially 16.66% of the diameter of the pivot projection 36. In the embodiment shown, the second clearance is substantially 0.5 mm.

The above clearances between the various components indicated above allows linear movement between the carriage 16 and the housing 14, and between the lug 70 on the carriage and the clamping member 22 at the cavity 72. This linear motion allows the various components to shift their position in the event of differences the diameter of the elongate article 12 in the two passes thereof, thereby assuring that both passes of the elongate article 12 are clamped tightly.

In addition to the clearances shown in regions marked I and II, there may also be clearances between the corner 74 and the holding projection 68, and between the pivot projection 36 and the clamping member 22.

There is thus described a securing device 10 that comprises a single rotatable clamping member 22 mounted on a single rotatable carriage 16 that effects clamping and release of two passes of the elongate article 12. The securing device 10 allows the release of both passes of the elongate article 12 by a single twist of the rotatable carriage 16. Both passes of the elongate article 12 can be clamped and released by a single rotation of one component.

The embodiment described herein provides the advantages that it is lightweight product. The elongate article 12 can be formed of a plastics material, which allows it to be transparent/translucent. The product has aesthetic qualities, making it suitable in situations where the hangers need to be highly discreet. The securing device 10 allows for fast and easy installation, and is less expensive than prior art devices.

The clamping arrangement is suitable for gripping an elongate article 12 in the form of a monofilament.

Various modifications can be made without departing from the scope of the invention. For example, the clamping surfaces 66 may be devoid of teeth. In another modification, the housing 50 may be devoid of the pivot projection 36.

Figure 18:
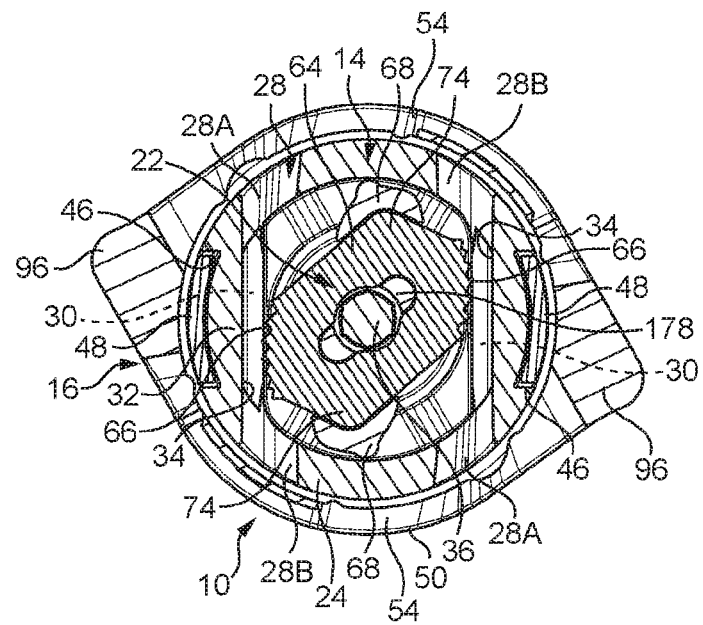
FIG. 18 is a sectional bottom view of another embodiment of the securing device.

A further modification is shown in FIG. 18. With the exception of the features discussed below, the securing device 10 shown in FIG. 18 possesses all the features of the securing device 10 described above and shown in FIGS. 1 to 17.

The features shown in FIG. 18, which are the same as the features shown in FIGS. 1 to 17, have been designated with the same reference numerals as the features in FIGS. 1 to 17.

In the securing device 10 shown in FIG. 18, there is no lug 70 on either of the two holding projections 68. In addition, there is no cavity 72 defined by the clamping member 22. In the embodiment shown in FIG. 18, both of the holding projections 68 comprise a substantially V-shaped receiving element shaped to receive a respective corner 74 of the clamping member 22.

In the embodiment shown in FIG. 18, by the clamping member 22 defines an elongate central aperture 178 is. The elongate central aperture 178 shown in FIG. 18 is of a size to receive the pivot projection 36 therethrough.

The elongate central aperture 178 provides the advantage that it allows the clamping member 22 to move relative to the pivot projection 36, and centralise itself relative to the internal region 26 of the housing 14.

The invention claimed is:

1. A securing device for securing an elongate article, the securing device comprising:
    a rotatable clamp member;
    a support for supporting the clamp member, the clamp member being rotatably mounted on the support;
    the securing device defining a pathway for the elongate article, wherein the clamp member is rotatably movable into the pathway; and
    the support further includes a spring member for urging the clamp member into a clamping position in said pathway;
    wherein the support comprises a rotatable carriage, the clamp member being held on the carriage, whereby rotation of the carriage effects rotation of the clamp member;
    the carriage comprising an outer portion, the outer portion extending around an inner region of the carriage;
    and the securing device comprises a housing to house the clamp member, the carriage being rotatably mounted on the housing, and the housing comprising a wall;
    wherein the wall is received in the inner region of the carriage.

2. A securing device according to claim 1, wherein the spring member is provided on the carriage, the carriage being rotatable to move the clamp member away from the clamping position to a release position.

3. A securing device according to claim 1, wherein the carriage is rotatable in a first direction to rotate the clamp member to the clamping position, and the carriage is rotatable in a second direction opposite to the first direction to rotate the clamp member to a release position to release the elongate article.

4. A securing device according to claim 3, wherein the carriage is rotatably urged by the spring member in the first direction to move the clamp member into said pathway.

5. A securing device according to claim 1, wherein the carriage includes an inner portion extending across the inner region.

6. A securing device according to claim 5, wherein the outer portion defines opposed access formations to allow access to and from an internal region of the carriage by the elongate article.

7. A securing device according to claim 5, wherein the spring member is provided on the inner portion.

8. A securing device according to claim 1, wherein the housing comprises an engaging surface to engage the elongate article when the clamp member is urged into clamping engagement with the elongate article.

9. A securing device according to claim 1, wherein the wall extends around an internal region of the housing, the internal region being arranged to receive the spring member, and the wall defining a pair of opposed openings through which the elongate article can extend.

10. A securing device according to claim 1, wherein the support comprises a pivot formation to rotatably mount the clamp member on the support, and the housing includes a support portion for supporting the pivot formation.

11. A securing device according to claim 10, wherein the carriage defines an aperture to receive the pivot formation, and wherein the pivot formation rotatably mounts the carriage on the housing.

12. A securing device according to claim 1, wherein the clamp member comprises a main part and a clamping surface on the main part, the clamping surface being for effecting the aforesaid clamping engagement with the elongate article.

13. A securing device according to claim 1, wherein the support comprises a hub portion, the spring member extending from the hub portion, and the securing device further includes a reaction surface to apply a reaction force to the spring member, thereby causing the spring member to urge the clamp member to the clamping position.

14. A securing device according to claim 1, wherein the carriage and the clamp member comprise cooperating holding formations to hold the clamp member on the carriage, thereby allowing the clamp member and the carriage to rotate together.

15. A securing device according to claim 14, wherein the cooperating holding formations comprise a holding projection on the carriage to hold the clamp member, and a surface of the clamp member to cooperate with the holding projection.

16. A securing device according to claim 15, wherein the cooperating holding formations comprise two of the holding projections, wherein the clamp member is held between the holding projections, and the cooperating holding formations further comprise two surfaces of the clamp member, each surface being arranged La cooperate with a respective one of the holding projections.

17. A securing device according to claim 16, wherein each holding projection comprises a receiving element shaped to receive said corner of the clamp member, the receiving element being substantially V-shaped.

* * * * *